United States Patent [19]

Barnoach

[11] Patent Number: 4,887,847
[45] Date of Patent: Dec. 19, 1989

[54] TUBE CONNECTOR

[75] Inventor: Itzhak Barnoach, London, England

[73] Assignee: Kitechnology B.V., Netherlands

[21] Appl. No.: 227,836

[22] Filed: Aug. 3, 1988

[30] Foreign Application Priority Data

Aug. 3, 1987 [GB] United Kingdom ............... 8718328
Mar. 21, 1988 [GB] United Kingdom ............... 8806654

[51] Int. Cl.$^4$ .............................................. F16L 11/12
[52] U.S. Cl. ........................................ 285/52; 285/55; 285/247
[58] Field of Search ............... 285/247, 256, 259, 149, 285/52, 55

[56] References Cited

U.S. PATENT DOCUMENTS

| 2,805,088 | 9/1957 | Cline et al. | 285/259 X |
| 2,877,027 | 3/1959 | Bagnell | 285/247 X |
| 4,437,689 | 3/1984 | Goebel et al. | 285/246 |

FOREIGN PATENT DOCUMENTS 1377495 9/1964 France .
0661271 11/1951 United Kingdom .

Primary Examiner—Dave W. Arola
Attorney, Agent, or Firm—Lowe, Price, LeBlanc, Becker & Shur

[57] ABSTRACT

A metal connector for the end of an internally and externally plastics coated metal tube maintains the metal of the tube, for example aluminium, out of contact with the metal of the connector, for example brass, and thereby avoids problems of anodic corrosion. This is achieved by forming the male portion of the connector with a tapered shank over which the tube end is forced for connection, and a shoulder to act as a stop for the tube end, the shoulder being of such relatively shallow radial depth that it abuts the internal plastics coating but not the metal of the tube. In another aspect of the invention, a second shoulder radially outward of the inner shoulder abuts the outer plastics coating and the two shoulders are radially separated by a radial groove that thereby prevents contact between the end of the metal tube and the metal connector.

22 Claims, 2 Drawing Sheets

TUBE CONNECTOR

FIELD OF THE INVENTION

This invention relates to connectors for plastics coated metal tube.

BACKGROUND OF THE PRIOR ART

Plastics coated metal tube of the type whose manufacture is described in European Pat. No. 0024220 consists of a thin walled tube of aluminium or aluminium alloy coated both internally and externally with a layer of a thermoplastic material, for example polyethylene. The tube is generally manufactured by forming a continuous strip of aluminium or aluminium alloy into a U-shape, transforming the U-shape into an overlapping tube, welding the overlapping edges together and immediately extruding polyethylene onto the interior and exterior surfaces of the tube, if necessary together with an intermediate adhesive layer to promote adhesion of the polythylene to the metal tube. The aluminium or aluminium alloy is generally approximately 0.2 mm thick and the inner and outer plastics coatings are generally each of the order of 1 mm thick.

Such plastics coated tube is rapidly replacing the more traditional copper pipe in the domestic and industrial plumbing fields in view of its lower production cost, greater ability to be produced, stored, transported and used on site in virtually continuous lengths. Such plastics coated metal tube does, however, need to be coupled to fixed appliances and various plumbing fittings, and conventional compression joints and fittings of both the manipulative and nonmanipulative type may be used for this purpose.

Plumbing fittings of this nature are traditionally manufactured from brass because of its durability. However, it has been found that the use of brass fittings in association with the plastics coated aluminium or aluminium alloy tube can result in problems of anodic corrosion in those instances where the aluminium or aluminium alloy in the tube comes into contact with the brass fitting. When the corrosion becomes severe, leakage can occur and this can be totally disastrous for a large scale pressurized piping system.

The present invention seeks to provide connectors for plastics coated metal tube of the type described above, in which contact between the connector and the metal of the tube is prevented.

SUMMARY OF THE DISCLOSURE

Accordingly, there is provided a metal connector for the end of an internally and externally plastics coated metal tube, the connector comprising a male portion including a tapered shank having a minimum external diameter which is approximately the same as the internal diameter of the tube and a maximum diameter which is greater than the internal diameter of the tube and is adapted to be inserted into the tube end and, above the tapered shank, a shoulder to form a stop for the tube end, the shoulder having a depth of less than the thickness of the internal layer of plastics material of the tube.

The male portion of the connector will generally be used in conjunction with a female portion, usually in the form of a nut, which can be threaded onto the male portion to grip the tube end between the interior of the female portion and the exterior of the tapered shank of the male portion.

In a first embodiment of the connector according to the invention, the shoulder is in the form of a very shallow step immediately above the tapered shank, sufficient in depth to form a stop for the tube as it is forced over the tapered shank but insufficient in depth to contact the end of the aluminium or aluminium alloy tube exposed at the cut end of the tube.

In a second, preferred, embodiment of the connector according to the invention, the shoulder is as described above to act as a primary stop by abutting the internal plastics layer of the tube, and there is provided also a supplementary shoulder spaced radially outwardly therefrom, the supplementary shoulder serving to abut the external plastics layer of the tube and the radial spacing between the two shoulders serving to span the end of the aluminium or aluminium alloy tube. In this second embodiment, the two shoulders can be looked upon as a single shoulder the annular surface of which is divided circumferentially by a notch, groove or similar means.

In both embodiments, the shoulder preferably extends around the entire circumference of the male portion of the connector to provide the required abutment stop for the tube as it is forced over the tapered shank. It is possible however, for the shoulder to be constituted by a plurality of abutment stops spaced around the circumference of the male portion of the connector.

BRIEF DESCRIPTION OF THE DRAWING

Two forms of connector in accordance with the invention will now be described in greater detail by way of example only with reference to the accompanying drawing, in which.

DESCRIPTION OF THE PREFERRED EMBODIMENTS

Figure 1:
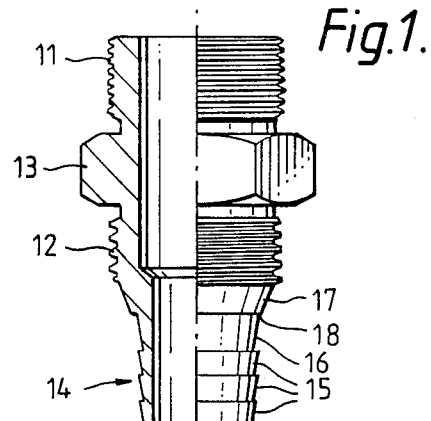
FIG. 1 is a side view, partly in section, of a male portion of a connector according to a first preferred embodiment of the invention.

Referring to the drawing, there is shown in FIG. 1 the male portion of a connector according to the first embodiment of the invention. The male portion is of cast brass with machined screw threads. It consists of an upper thread 11 by means of which it can be attached to a further connector or fixed appliance for example, a lower thread 12 by means of which it can be attached to a complementary female portion, an intermediate hexagonal body portion 13 and a lower tapered shank 14 over which the open end of the tube can be pushed.

The shank 14 is of a size such that the tube to which it is to be attached will be a tight push fit over it and indeed may be of such a size that the end of the tube may have to be splayed in order to provide the necessary push fit. The overall taper of the shank will generally be small, for example about 2.5° with respect to the longitudinal axis of the connector. The shank is, however, made up of a series of frusto-conical portions 15, each of which has a more pronounced taper, for example about 12° with respect to the longitudinal axis of the connector. The upwardly facing shoulders formed by these frusto-conical portions ensure a better grip of the connector on the interior of the tube after the latter has been pushed over the shank.

Immediately above the frusto-conical portions 15 are two further tapered portions 16 and 17. At the junction between these two tapered portions, there is a downwardly facing shoulder 18. The shoulder serves two purposes: first, it forms a stop for the tube end as it is pushed over the shank 14 and thereby helps to prevent the tube end being overstretched by the connector; secondly, and more importantly, it abuts the interior plastics coating of the tube end and, because of the depth of the shoulder, the metal portion of the tube is held away from the brass body of the connector and is thereby unable to participate in any electro-chemical reaction with the connector. For this latter purpose, the shoulder must, of course, be shallower than the thickness of the interior plastics coating; for example, if the interior plastics coating has a thickness of about 1.0 mm, then the shoulder may have a depth of about 0.5 mm.

Figure 2:
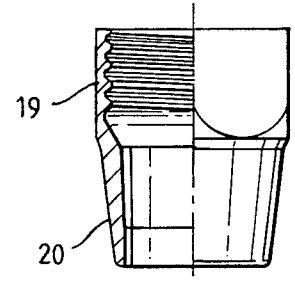
FIG. 2 is a side view, partly in section, of a female portion of a connector to complement the male portion of FIG. 1.

The female portion of the connector shown in FIG. 2 comprises an upper body portion 19 having an interior screw thread and an outer hexagonal shape, and a lower tapered barrel 20. The interior taper will be of the same order as the exterior taper on the shank of the male portion of the connector, for example about 2.5°, and will have an interior diameter at its narrowest part, i.e. at its lower end, corresponding to the outer diameter of the tube.

To attach the connector to the tube, the female portion of the connector is first pushed down over the end of the tube with the threaded end 19 towards the end of the tube. The end of the tube is then pushed over the shank 14 of the male portion until the end of the tube abuts the shoulder 18. The female portion of the connector is then brought up over the end of the tube and the two portions are threaded together using a pair of wrenches to fully tighten the two portions together.

Figure 3:
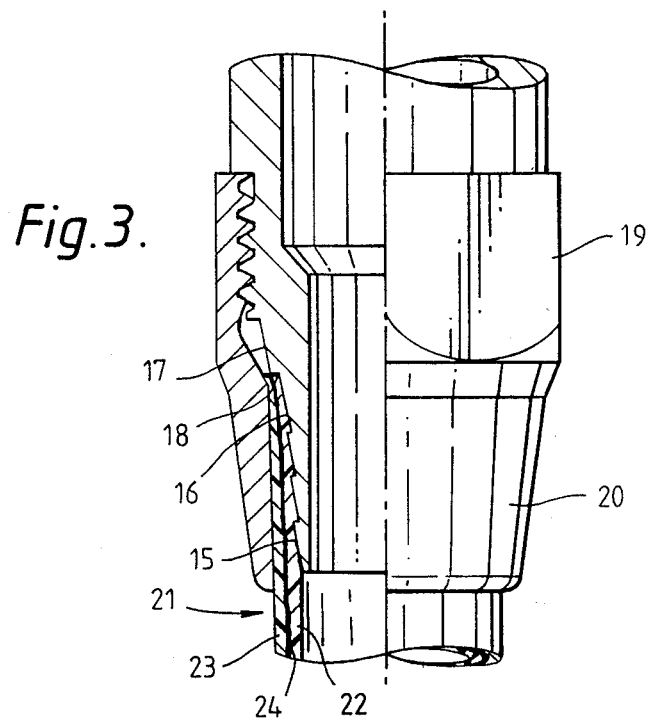
FIG. 3 is a side view, partly in section, of a connector assembly of the male and female portions of FIGS. 1 and 2, respectively, on the end of a tube.

The assembled connector is shown in FIG. 3 of the drawings on the end of a tube 21 which consists of inner and outer coatings 22, 23 of plastics material, for example polyethylene, on a thin aluminium tube 24. As can be seen, the end of the tube 21 abuts the shoulder with the end of the aluminium tube 24 maintained out of contact with any part of the connector.

Figure 4:
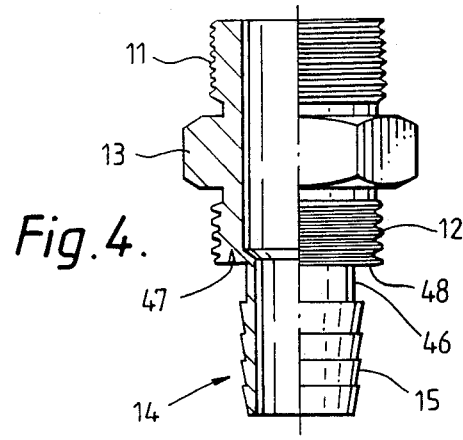
FIG. 4 is a side view, partly in section, of a male portion of a connector according to a second embodiment of the invention.

Referring now to FIG. 4, there is shown the male portion of a second embodiment of a connector according to the invention. It is identical in most respects to the male portion of the first connector shown in FIG. 1 and the same reference numerals are used to identify the same features of it. It differs from the male portion shown in FIG. 1, however, in that instead of having tapered body portions 16 and 17 and an intermediate shoulder 18, it has immediately above the frusto-conical portions 15, a cylindrical portion 46 and a downwardly facing shoulder 48. This shoulder forms a stop for the tube end as it is pushed over the shank 14 and thereby helps to prevent the tube end being over-stretched by the connector. However, in order to prevent contact between the metal portion of the tube and the brass body of the male portion of the connector, the shoulder 48 is provided with an annular recess in the form of a notch 47, the radial widths of the notch and of that portion of the shoulder adjacent the cylindrical portion 46 being such that with the shank pushed fully into the tube with the tube end abutting the shoulder 48, the metal portion of the tube lies above the notch. For example, if the interior plastics coating has a thickness of about 1.0 mm, then the shoulder may have a width of about 0.5 mm, and the notch may have a width of about 1.0 to 1.5 mm.

This second type of male portion of the connector is used in conjunction with the female portion shown in FIG. 2 and described above, and the connector is attached to the tube in the manner described above in connection with FIGS. 1, 2 and 3.

Figure 5:
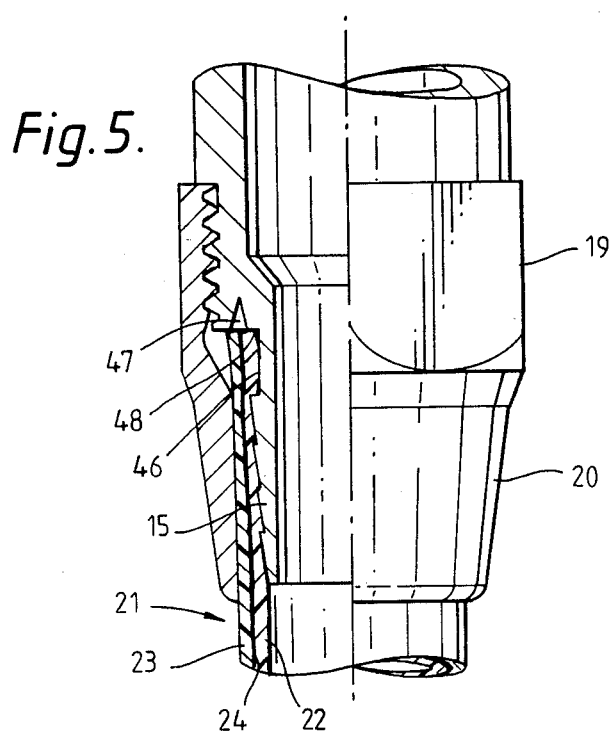
FIG. 5 is a side view, partly in section, of a connector assembly of the male and female portions of FIGS. 4 and 2, respectively, on the end of a tube.

The assembled connector is shown in FIG. 5 of the drawings on the end of a tube 21 which consists of inner and outer coatings 22, 23 of plastics material, for example polyethylene, on a thin aluminium tube 24. As can be seen, the end of the inner coating 22 abuts the shoulder 48 with the end of the aluminium tube 24 above the notch 47 and hence out of contact with any part of the connector.

In this disclosure there are shown and described only the preferred embodiments of the invention, but it is to be understood that the invention is capable of use in various other combinations and environments and is capable of changes or modification within the scope of the inventive concept as expressed herein.

I claim:

1. A metal connector for connecting to an end of an imperforate metal tube that is both internally and externally coated with a predetermined thickness of plastics material, comprising:
    a male portion, including a tapered shank having a minimum external diameter which is approximately the same as the internal diameter of the tube and a maximum diameter which is greater than the internal diameter of the tube and is adapted to be inserted into said end of the tube and, adjacent to the tapered shank, a first shoulder to form a stop for the tube end, the shoulder have a radial depth that is less than the thickness of the internal layer of plastics material thereby permanently preventing contact of the metal tube with the metal connector.

2. A connector according to claim 1, further comprising:
    a female portion formed to be threaded onto the male portion to grip the tube end between an interior surface of the female portion of an exterior surface of the tapered shank of the male portion.

3. A connector according to claim 2, wherein:
    the first shoulder is in the form of a shallow step extending radially to a predetermined height immediately adjacent to the tapered shank.

4. A connector according to claim 2, wherein further comprising:
    a second shoulder spaced radially outwardly of said first shoulder to a predetermined height to form a stop for the external plastics coating of the tube, a radial spacing between the first and second shoulders being selected to be sufficient to span the a thickness of said metal tube at said end.

5. A connector according to claim 2, wherein:
    the first shoulder extends around the entire circumference of the male portion.

6. A connector according to claim 2, wherein:
    said tapered portion has an overall lengthwise taper of approximately 2.5 degrees.

7. A connector according to claim 6, wherein:

at least one lengthwise portion of said tapered portion, that has a lengthwise taper of approximately 12 degrees.

8. A connector according to claim 1, wherein:
the first shoulder is in the form of a shallow step extending radially to a predetermined height immediately adjacent to the tapered shank.

9. A connector according to claim 8, wherein:
the first shoulder extends around the entire circumference of the male portion.

10. A connector according to claim 8, wherein:
said radial height of said first shoulder is 0.5 mm.

11. A connector according to claim 1, further comprising:
a second shoulder spaced radially outwardly of said first shoulder to a predetermined height to form a stop for the external plastics coating of the tube, a radial spacing between the first and second shoulders being selected to be sufficient to span a thickness of said metal tube at said end.

12. A connector according to claim 11, wherein:
the first shoulder extends around the entire circumference of the male portion.

13. A connector according to claim 11, wherein:
said first and second shoulders are radially separated by a circumferentially disposed groove having a width defined by said radial spacing to prevent contact between the metal of the tube and the metal of the connector.

14. A connector according to claim 13, wherein:
said predetermined radial span of said groove is in the range 1.0 mm to 1.5 mm.

15. The connector of claim 13, wherein said metal of the tube is opposed to the circumferentially disposed groove and thereby the metal of the tube is maintained out of contact with said connector to avoid anodic corrosion.

16. A connector according to claim 11, wherein:
said radial height of said first shoulder is 0.5 mm.

17. A connector according to claim 16, wherein:
said first and second shoulders are separated radially by a distance of 1.0 mm to 1.5 mm.

18. A connector according to claim 1, wherein:
the first shoulder extends around the entire circumference of the male portion.

19. A connector according to claim 18, wherein:
said first and second shoulders are radially separated by a circumferentially disposed groove of a predetermined radial span.

20. A connector according to claim 1, wherein:
said tapered portion has an overall lengthwise taper of approximately 2.5 degrees.

21. A connector according to claim 20, further comprising:
at least one lengthwise portion of said tapered portion, that has a lengthwise taper of approximately 12 degrees.

22. A metal connector for attachment to the end of a tube manufactured by forming a continuous metal strip into an overlapping tube, welding the overlapping edges together and extruding a layer of a plastics material onto the internal and external surfaces of the metal tube, the connector comprising:
a male portion including a tapered shank having a minimum external diameter which is approximately the same as the internal diameter of the tube and a maximum diameter which is greater than the internal diameter of the tube and is adapted to be inserted into the tube end and, above the tapered shank, a shoulder to form a stop for the tube end, the shoulder having a depth of less than the thickness of the internal layer of plastics material of the tube thereby permanently preventing contact of the metal tube with the metal connector.

* * * * *